June 13, 1944.  J. M. SIMPSON  2,351,554
PISTON
Filed Jan. 9, 1942  2 Sheets-Sheet 2

Inventor:
John M. Simpson
By Edward C. Gritzbaugh
Atty.

Patented June 13, 1944

2,351,554

UNITED STATES PATENT OFFICE 2,351,554

PISTON

John M. Simpson, Muncie, Ind., assignor to Borg-Warner Corporation, Chicago, Ill., a corporation of Illinois Application January 9, 1942, Serial No. 426,126

15 Claims. (Cl. 188—72)

This invention relates to power operated clutches and brakes and particularly to a piston construction to be used with such mechanism.

One of the problems involved in the design of a suitable power operated clutch or brake is the reduction of weight in the rotating parts in order to reduce rotational inertia. Increased weight on the flywheel of an internal combustion engine, for example, results in a sluggish engine and in a consequent loss in acceleration. Increased rotational inertia also imposes heavier loads on the elements to be coupled unless they can be coupled at the instant that they are rotating synchronously. Aside from the weight consideration and its effect upon the operation of the drive, it is also desirable from the standpoint of economy to reduce the amount of, and cheapen, the metal required for such a device.

The principal object of this invention, therefore, is to provide a light-weight power operator for operating either a clutch or a brake.

Another object of this invention is to provide a power operator for a clutch or brake which is constructed entirely of sheet metal stampings or similar thin-walled material.

These and other objects of the invention will become apparent from the following description when taken together with the accompanying drawings in which.

Figure 1:
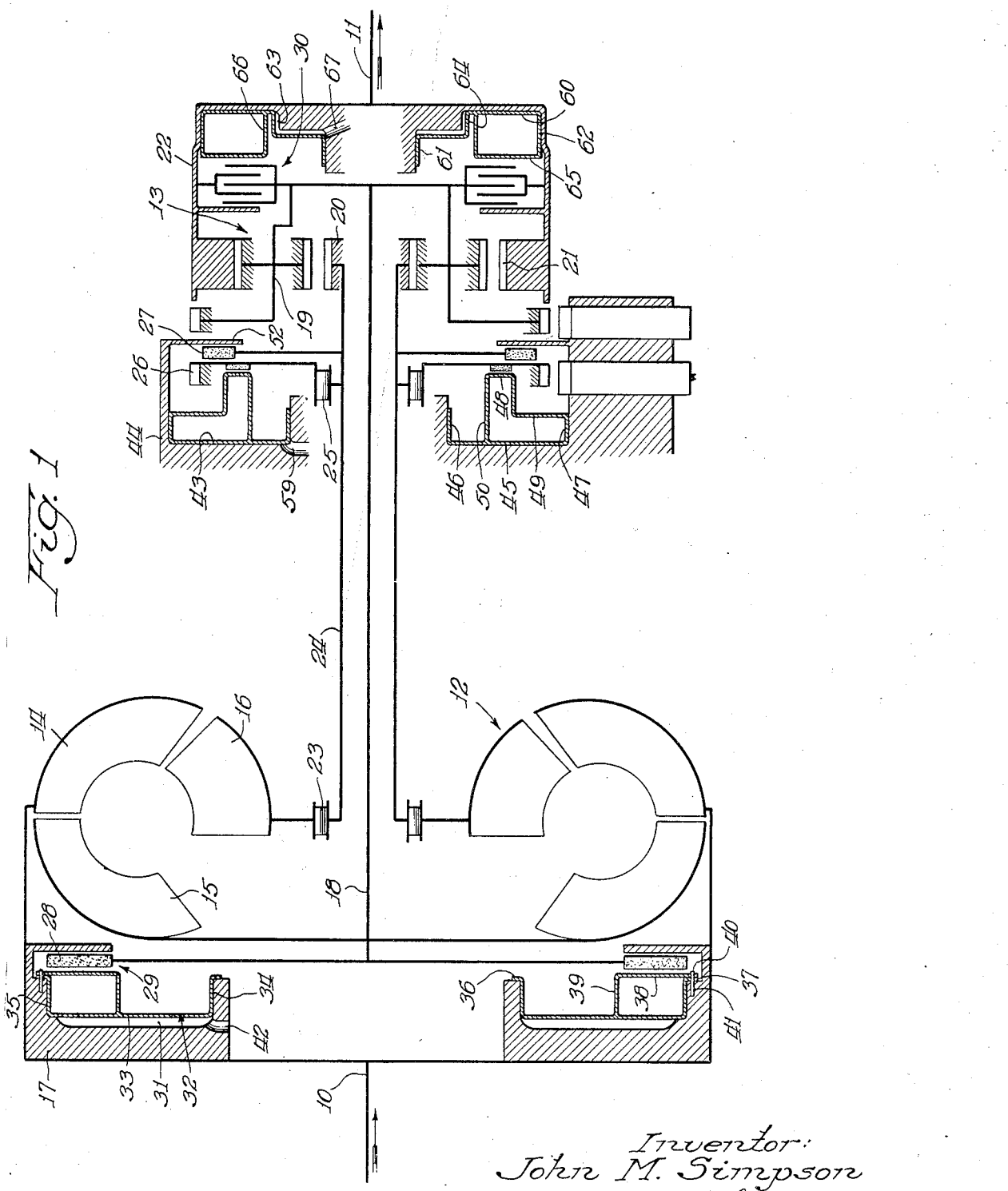
Fig. 1 is a schematic diagram of an automatic transmission showing examples of the uses to which this invention may be put.

Referring now to Figure 1 for a detailed description of the invention, the transmission chosen for illustrative purposes comprises a drive shaft 10, a driven shaft 11, a torque converter 12 driven from drive shaft 10 and planetary gearing 13 which transmits the drive from torque converter 12 to driven shaft 11.

Torque converter 12 is comprised of a pump element 14, a turbine element 15, and a stator element 16, all cooperating to form a toroidal hydraulic circuit. Pump element 14 is connected to a flywheel 17 which, in turn, is driven directly by drive shaft 10. Turbine element 15 is connected to an intermediate shaft 18 which, in turn, drives the carrier 19 of planetary gear set 13. Double planet gears are used, one of which is connected to a sun gear 20 and the other of which is connected to a ring gear 21. Ring gear 21 is connected through a cylindrical housing 22 to driven shaft 11. Sun gear 20 is connected through an over-running clutch 23 to stator element 16, the clutch being so arranged as to permit stator 16 to rotate ahead of sun gear 20. The connection between sun gear 20 and overrunning clutch 23 comprises a sleeve 24 which is connected through a one-way roller-and-cam device 25 to a brake element 26. A second brake element 27 is connected directly to sleeve 24 to provide a two-way brake.

At the forward end of the transmission, shaft 18 is drivingly connected with a friction disc 28 of a clutch 29 which serves to connect shaft 18 directly to drive shaft 10. This, in effect, directly couples pump element 14 with turbine element 15 to render the torque converter 12 ineffective to transmit torque.

At the rear of the transmission a multiple-plate friction clutch 30 is used to connect planet carrier 19 with ring gear 21 to lock up the planetary gear set 13 for direct drive.

The operation of the transmission briefly is as follows:

The transmission is initially operated with brake 26 arrested and clutches 29 and 30 disengaged. Under these conditions power will be transmitted from drive shaft 10 through flywheel 17 and torque converter 12 to intermediate shaft 18, whence the drive is transmitted to carrier 19. With brake element 26 held against rotation, roller-and-cam device 25 is so arranged as to act as a one-way brake and hence sun gear 20 cannot rotate backwardly. Due to the double planetary arrangement, the reaction of the load on ring gear 21 is such as to cause sun gear 20 to tend to rotate in a reverse direction, but since this is not possible, the net result is to rotate ring gear 21 in a forward direction. There will be a double reduction in speed and a double multiplication in torque, the first reduction occurring in torque converter 12, and the second in planetary gear set 13. At a speed of say 15 miles per hour, clutch 29 is operated to lock out torque converter 12 to eliminate one speed reduction. At a still higher speed of approximately 23 miles per hour, clutch 30 is operated to lock up planetary gear set 13, and the entire transmission therefore rotates as a unit to transmit the drive directly from drive shaft 10 to driven shaft 11.

It is unnecessary to release brake element 26 for direct drive since roller-and-cam device 25 will free sun gear 20 when clutch 30 is engaged.

For reverse drive carrier 19 is held against rotation and brake element 26 and clutches 29 and 30 are released. This serves to hold turbine element against rotation and therefore reverses the function of this element with respect to stator 16 so that the latter becomes the driving element and drives sun gear 20 in a reverse direction. Because of the double planetary arrangement, ring gear 21 will likewise be rotated in a reverse direction thereby effecting reverse drive through the transmission.

Although the clutches and brake just described are somewhat different devices, i. e., clutch 29 is a single-disc friction clutch, clutch 30 is a multiple-plate clutch and element 26 is a brake, all three nevertheless are operated by means of hydraulically controlled pistons each piston incorporating the novel construction of this invention.

Referring now to clutch 29, flywheel 17 is formed with an annular cylinder 31 in which is mounted a piston 32. Said piston is comprised of a sheet metal annulus 33 having axially extending flanges 34 and 35 formed integrally therewith. Flanges 34 and 35, in addition to stiffening annulus 33, serve, of course, to guide piston 32 in cylinder 31. The ends 36 and 37 of flanges 34 and 35 respectively may be turned over as shown to provide stops for the piston.

It will be apparent that the central portion of annulus 33, being relatively thin, would readily flex under the influence of pressure and thereby distort the piston unless suitable support were provided for this region. Such support is provided by a second sheet metal annulus 38 which is formed with an axially extending flange 39 in the line of thrust and located at or near the central unsupported section of annulus 33. Said supporting annulus 38 overlies the edge 37 of flange 35 and receives axial support therefrom. Said annulus 38 also provides the friction surface which is to engage driven disc 28 to effect a clutching engagement between the flywheel and shaft 18. A plurality of pins 40 passes through annulus 38 and turned edge 37 of flange 35 into suitable apertures 41 in the flywheel to prevent the piston from turning relative thereto and at the same time to permit relative axial movement therebetween.

Fluid under pressure is admitted behind piston 32 through a conduit 42 in flywheel 17.

Figure 2:
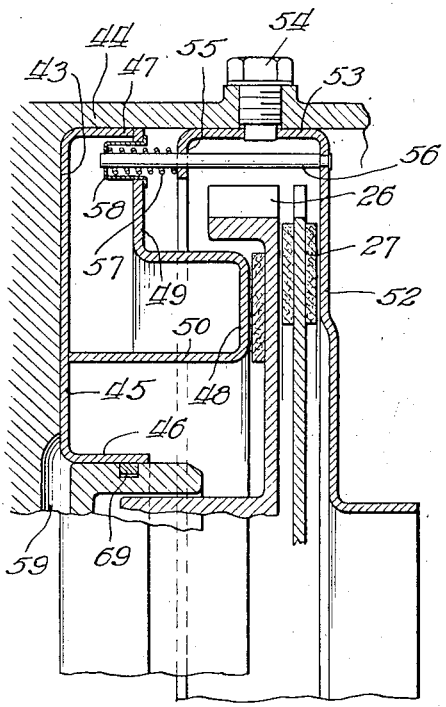
Fig. 2 is an elevation in section through a power operated sheet metal brake.

The sheet metal construction as applied to the brake is shown in Fig. 2. In this application a cylinder 43 is formed in a fixed casing 44 within which is located a sheet metal annulus 45 having flanges 46 and 47 for stiffening and guiding purposes. The working end of the piston is comprised of a second sheet metal annulus 48 having an offset portion 49 which overlies the edge of flange 47. As in piston 32, annulus 48 is provided with an axially extending flange 50 which abuts annulus 45 substantially at or near the center of the unsupported section thereof. Flange 50 thereby provides axial stiffness for annulus 45.

The axial thrust of the piston may be taken by another sheet metal annulus 52 which has an axial flange 53 formed therein through which passes an anchor bolt 54 to prevent the annulus from rotating. The end of flange 53 may be turned inwardly as at 55, and a pin 56, passed the annulus is offset to provide an axially extending section 64. The working end of the piston is comprised of an annulus 65 which, as in the previous designs, is provided with an axially extending flange 66 which is located adjacent axial portion 64 and abuts annulus 60. Annulus 65 overlies the edge of flange 62 so as to receive support therefrom. Fluid under pressure may be introduced into the cylinder 63 through passage-way 67.

Figure 3:
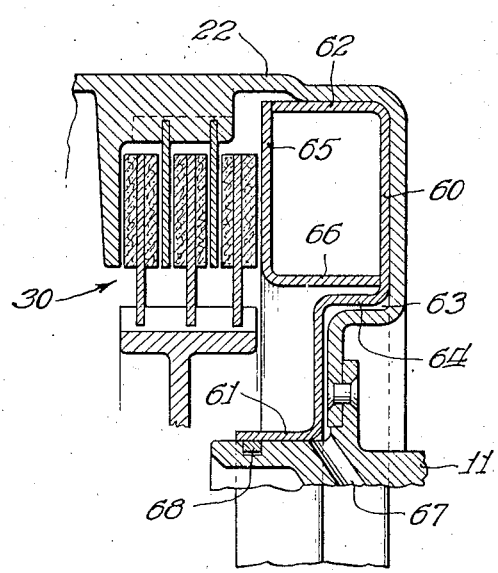
Fig. 3 is an elevation in section of a power operated sheet metal piston for a clutch.

In each of the pistons illustrated one or more expansion rings such as 68 in Figure 3 and 69 in Figure 2 may be used to prevent excessive leakage past the pistons.

The foregoing piston construction, particularly as applied to automatic transmissions for automobiles, provides light-weight, low-inertia operators which possess all of the necessary strength without depriving the automobile of its acceleration characteristics or slowing up the shifts.

Although the invention has been described with reference to sheet metal stampings, it is intended that some parts of, or the entire operator may be made of light, thin-walled castings.

It is understood that the foregoing description is merely illustrative of a preferred embodiment of the invention and that the scope of the invention therefore is not to be limited thereto but is to be determined by the appended claims.

I claim:

1. A light-weight piston for operating a coupling device in a power transmitting mechanism, said piston comprising a sheet metal annulus having axially disposed flanges and a sheet metal working annulus having an axially disposed flange which contacts the region between flanges of the first-mentioned annulus, the second annulus contacting the end of one of the flanges of the first-mentioned annulus, whereby axial rigidity of the piston is secured.

2. A brake for a transmission having a member which is to be held against rotation, said brake comprising a friction element on the member, a sheet metal reaction plate, means for anchoring the reaction plate against rotation, a fixed casing having an annulus cylinder formed therein, a piston in said cylinder, the piston comprising a sheet metal annulus having axially extending flanges, a second annulus opposite the friction element and having an axially extending flange for supporting the mid-section of the first annulus, said second annulus overlying one of the flanges of the first annulus and receiving support therefrom, and means for holding the second annulus against rotation, said second annulus being adapted to urge the friction element toward the reaction plate to hold the element against rotation, said reaction plate having axnulus against rotation, said second annulus being adapted to urge the friction element toward the reaction plate to hold the element against rotation, said reaction plate having axially spaced flanges, said means for holding the second annulus comprising a pin passing through the flanges and through the second annulus, and resilient means between the pin and annulus for returning the piston to released position.

4. A light-weight piston for operating a coupling device in a power transmitting mechanism, said piston comprising an element of sheet material capable of flexing, said element forming one end of the piston, a sheet material strut in the line of thrust on the piston and cooperating with said piston end to stiffen the end, and a sheet material portion forming the other end of the piston.

5. A light-weight piston for operating a coupling device in a power transmitting mechanism, said piston comprising a sheet material element forming one end of the piston, and a second sheet material element forming the other end of the piston, one of said elements being formed with a portion in the line of thrust on the piston providing axial rigidity and being disposed such that its rigid portion braces against flexure the central region of the other element.

6. A light-weight piston for operating a coupling device in a power transmitting mechanism, said piston comprising a sheet material element forming the sides and one end of the piston, and a second sheet material element forming the working end of the piston, said last named element having a portion providing axial rigidity and being disposed such that its said rigid portion braces against flexure the region of the first named element between the sides thereof.

7. A light-weight piston for operating a coupling device in a power transmitting mechanism, said piston being of sheet material and having at least one wall substantially in the line of thrust and another wall transverse to said line of thrust, said latter wall forming one end of the piston, a sheet material strut having a section in the line of thrust and cooperating with said transverse wall to stiffen the wall, and a sheet metal portion forming the other end of the piston.

8. A light-weight piston for operating a coupling device in a power transmitting mechanism, said piston comprising a sheet metal annulus having axially extending flanges, and a strut providing axial rigidity and cooperating with said annulus to brace it against flexure in its region between its flanges.

9. A light-weight piston for operating a coupling device in a power transmitting mechanism, said piston comprising a sheet metal annulus having axially extending flanges and forming one end of the piston, a strut providing axial rigidity and cooperating with said annulus to brace it against flexure in its region between its flanges, and a sheet metal portion forming the other end of the piston and providing a flat friction clutching surface.

10. A light-weight piston for operating a coupling device in a power transmitting mechanism, said piston comprising a sheet metal annulus having axially extending flanges, and a second sheet metal annulus having an axial flange, said last named flange cooperating with the first annulus to stiffen the portion between flanges, said second annulus overlying one of the flanges of the first annulus to receive support therefrom.

11. In a coupling device, the combination of a sheet metal reaction plate, a casing having a cylinder formed therein, a piston in said cylinder, a friction element between said piston and said reaction plate, said piston being adapted to clutch the friction element between the piston and reaction plate, said reaction plate being provided with two spaced flanges both of which are on the same side of the piston as said friction element, and means for preventing relative rotation between the piston and reaction plate and comprising a pin passing through said flanges and into said piston.

12. In a brake for a transmission, the combination of a sheet metal reaction plate, means for anchoring the reaction plate against rotation, a fixed casing having a cylinder formed therein, a piston in said cylinder, a friction element between said piston and said reaction plate, said piston being adapted to urge the friction element toward the reaction plate to hold the element against rotation, said reaction plate being provided with two spaced flanges both of which are on the same side of the piston as said friction element, and means for holding said piston against rotation and comprising a pin passing through said flanges and into the piston.

13. A light weight piston for operating a coupling device in a power transmitting mechanism, said piston comprising a sheet metal annulus having axially disposed flanges and a sheet metal working annulus contacting the end of one of the flanges of the first mentioned annulus and having an axially disposed flange which contacts the region between flanges of the first mentioned annulus, one of said annuli being formed with an axially disposed rib portion intermediate its sides, whereby axial rigidity of the piston is obtained.

14. A light weight piston for operating a coupling device in a power transmitting mechanism, said piston comprising a sheet metal annulus having axially disposed flanges and a sheet metal working annulus contacting the end of the outer one of the flanges of the first mentioned annulus and having an axially disposed flange which contacts the region between the flanges of the first mentioned annulus, said second mentioned annulus being formed with an axially disposed rib portion intermediate its flange and its portion in contact with the outer flange of said first mentioned annulus, whereby axial rigidity of the piston is obtained.

15. A light weight piston for operating a coupling device in a power transmitting mechanism, said piston comprising a sheet metal annulus having axially disposed flanges and a sheet metal working annulus contacting the end of the outer flange of the first mentioned annulus and having an axially disposed flange which contacts the region between flanges of the first mentioned annulus, said first mentioned annulus being provided with an axially disposed rib portion between its portion contacted by the flange of said second mentioned annulus and the inner flange of the first mentioned annulus, whereby axial rigidity of the piston is obtained.

JOHN M. SIMPSON.